United States Patent
Rieger et al.

[11] Patent Number: 5,832,312
[45] Date of Patent: Nov. 3, 1998

[54] WATERTIGHT BODY FOR ACCOMMODATING A PHOTOGRAPHIC CAMERA

[75] Inventors: Albert Rieger, Unterboehringen, Germany; David Barclay, Bergen; Steven Chapman, Corfu, both of N.Y.; Heinz-Andreas Kellner, Stuttgart; Michael Reibl, Boeblingen, both of Germany; James G. Rydelek, Henrietta, N.Y.; Andreas Schweizer, Bad Ditzenbach, Germany

[73] Assignee: Eastman Kodak Company, Rochester, N.Y.

[21] Appl. No.: 799,556

[22] Filed: Feb. 10, 1997

[30] Foreign Application Priority Data

Feb. 22, 1996 [DE] Germany .................. 196 06 528.3
Oct. 21, 1996 [DE] Germany .................. 196 43 332.0

[51] Int. Cl.⁶ .................................................. G03B 17/08
[52] U.S. Cl. .............................................. 396/25; 396/29
[58] Field of Search ................... 396/25, 27, 29

[56] References Cited

U.S. PATENT DOCUMENTS

| | | |
|---|---|---|
| 4,766,451 | 8/1988 | Fujimura et al. . |
| 4,804,987 | 2/1989 | Arai . |
| 4,882,600 | 11/1989 | Van de Moere . |
| 5,131,778 | 7/1992 | Asai et al. . |
| 5,285,894 | 2/1994 | Kamata et al. ............................. 396/29 |
| 5,532,315 | 7/1996 | Bonekamp et al. ......................... 525/71 |
| 5,563,674 | 10/1996 | Von Holtz et al. . |
| 5,643,390 | 7/1997 | Don et al. ............................. 156/307.1 |

FOREIGN PATENT DOCUMENTS

| | | |
|---|---|---|
| 679929 | 11/1995 | European Pat. Off. . |
| 7-104367 | 4/1995 | Japan . |

OTHER PUBLICATIONS

C. Jaroschek and W. Pfleger, "Harte und weiche Kunststoffe beim Spritzgieben kombinieren", Jun. 1994, vol. 84, #6, pp. 705, 706, 708, 709, 710.

*Primary Examiner*—David M. Gray
*Attorney, Agent, or Firm*—Robert Luke Walker

[57] ABSTRACT

A watertight body for accommodating a photographic camera. The body has a first and a second body shell of rigid polymer material that can be joined together for accommodating a photographic camera. The body has sealing means comprising elastic polymer material provided by a multiple-component injection molding process on an edge of at least one body shell that forms the joint and on surface areas of the body shells. The elastic polymer material is connected to the body shell by chain looping (molecular entanglement) of the polymer materials. The result is that the body is reliably sealed against water and is nevertheless inexpensive and simple to manufacture. For a simple and correspondingly inexpensive recyclability of the body, the body shells can be crushed without separation of the polymer materials using known devices, with the resultant material mix being usable as an admixture for the manufacture of new camera components.

18 Claims, 3 Drawing Sheets

5,832,312

WATERTIGHT BODY FOR ACCOMMODATING A PHOTOGRAPHIC CAMERA

CROSS-REFERENCE TO RELATED APPLICATION(S)

Reference is made to commonly assigned co-pending U.S. patent application Ser. No. 08/799,586, entitled: WATERTIGHT PHOTOGRAPHIC SINGLE-USE CAMERA, and filed in the names of Albert Reiger, David Barclay, Steven Chapman, Heinz-Andreas Kellner, Michael Reibl, James G. Rydelek, and Andreas Schweizer each of which are assigned to the assignee of this application.

1. Field of the Invention

The invention relates to cameras and more particularly relates to a watertight body for accommodating a photographic camera having two body shells that can be joined together and that comprise a rigid polymer material.

2. Background of the Invention

Photographic cameras with an outer body enclosing the camera for protection against the effects of moisture and dust are known. For example, U.S. Pat. No. 4,882,600, DE 37 21 556, DE 37 33 403 and DE 44 14 854 or JP 7-104367 disclose such bodies, in some cases watertight.

The joint created in the assembled condition of the body elements is here mostly sealed using separate elastic sealing elements, for example O-rings, gaiter-like rubber elements, sealing elements etc.

DE 44 14 854 describes a roll film pack comprising a light-tight core body with roll film, shutter, film transport device, lens etc. and being enclosable by two shells formed out of rigid plastic. Sealing of the body shells, which though not watertight is effective against dust and splash water, is achieved by welding the shells together and sealing the joint by means of an elastic but nevertheless stable stuck-on strip.

Design versions of this type are therefore marked by a large number of joinable individual parts, so that manufacture of the body is intensive in time, material and cost.

It would thus be desirable to provide a watertight body for accommodating a photographic camera that is of simple design and ensures dependable watertightness. It would also be desirable to ensure inexpensive recyclability of the used camera body.

SUMMARY OF THE INVENTION

The invention is defined by the claims. The invention provides a watertight body for accommodating a photographic camera. The body has a first and a second body shell of rigid polymer material that can be joined together for accommodating a photographic camera. The body has sealing means comprising elastic polymer material on an edge of at least one body shell that forms the joint and on surface areas of the body shells. The elastic polymer material is connected to the body shell by chain looping (molecular entanglement) of the polymer materials. The result is that the body is reliably sealed against water and is nevertheless inexpensive and simple to manufacture. For simple and correspondingly inexpensive recyclability of the body, the body shells can be crushed without separation of the polymer materials using known devices. The resultant material mix is usable as an admixture for the manufacture of new camera components.

BRIEF DESCRIPTION OF THE FIGURES

The above-mentioned and other features and objects of this invention and the manner of attaining them will become more apparent and the invention itself will be better understood by reference to the following description of an embodiment of the invention taken in conjunction with the accompanying figures wherein.

DESCRIPTION OF PARTICULAR EMBODIMENTS

Figure 2:
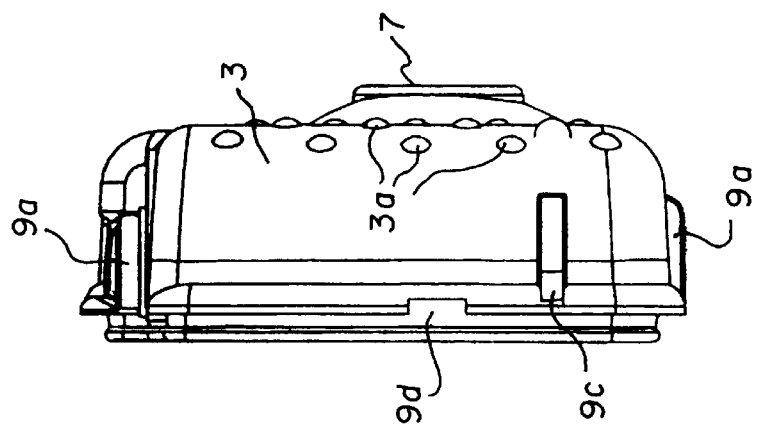
FIG. 2 shows the front body shell of the body of Fig., in a side view.
Figure 1:
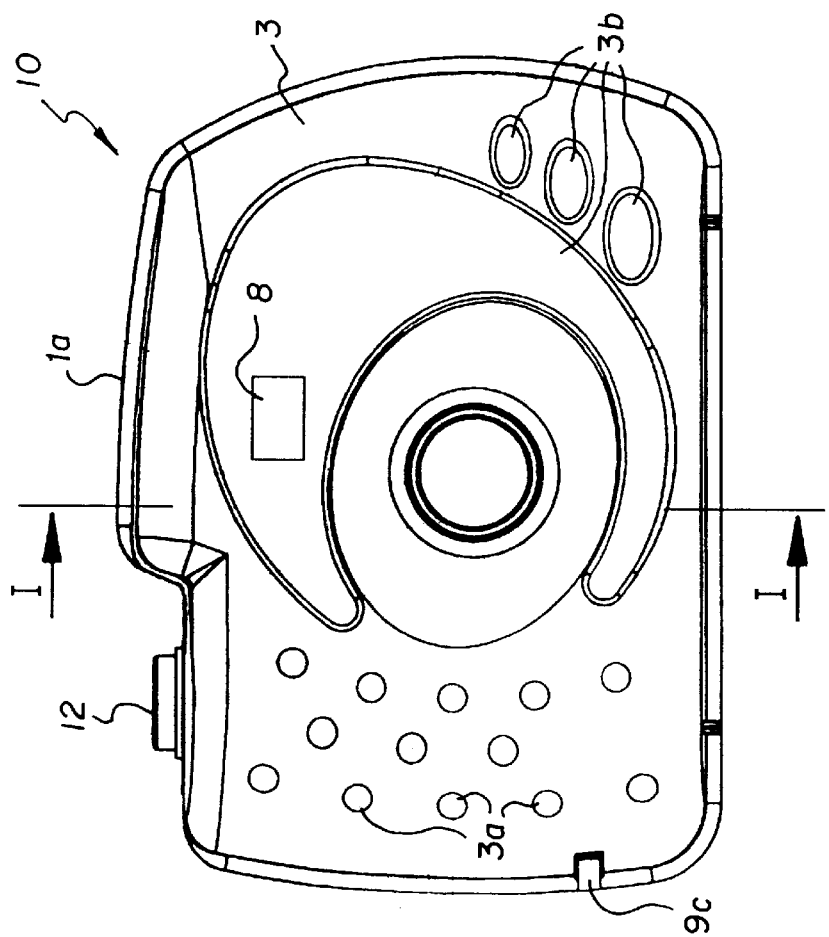
FIG. 1 shows the body in accordance with the invention in a front view.
Figure 4:
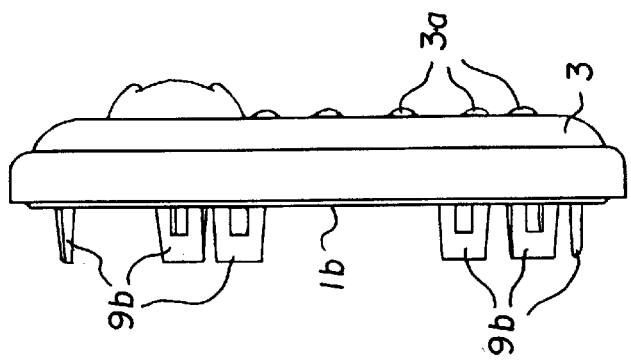
FIG. 4 shows the rear body shell of the body of Fig., in a side view.
Figure 3:
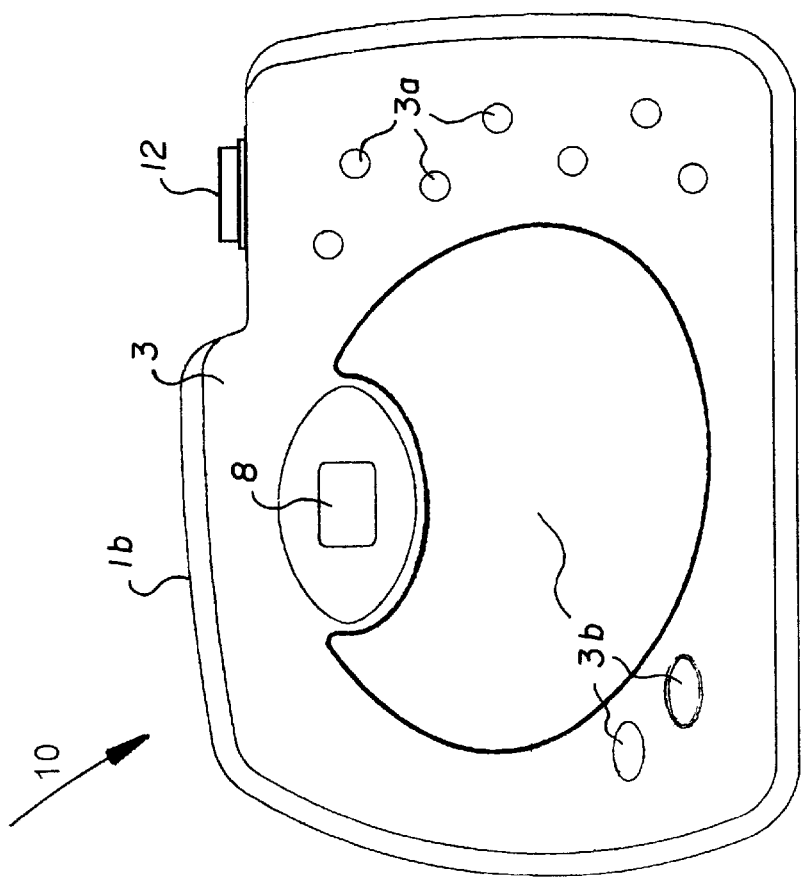
FIG. 3 shows the body of FIG. 1, in a rear view.
Figure 5:
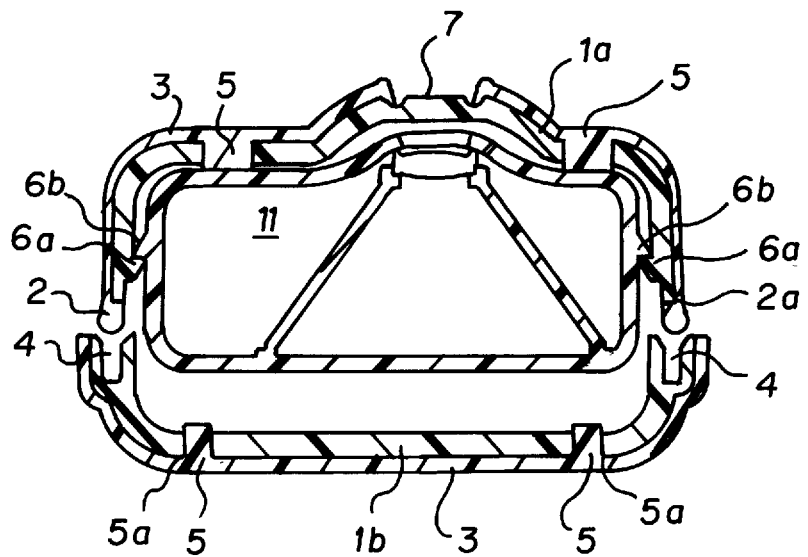
FIG. 5 shows in a diagrammatic view the opened body with a camera along the line I—I in FIG. 1.
Figure 6:
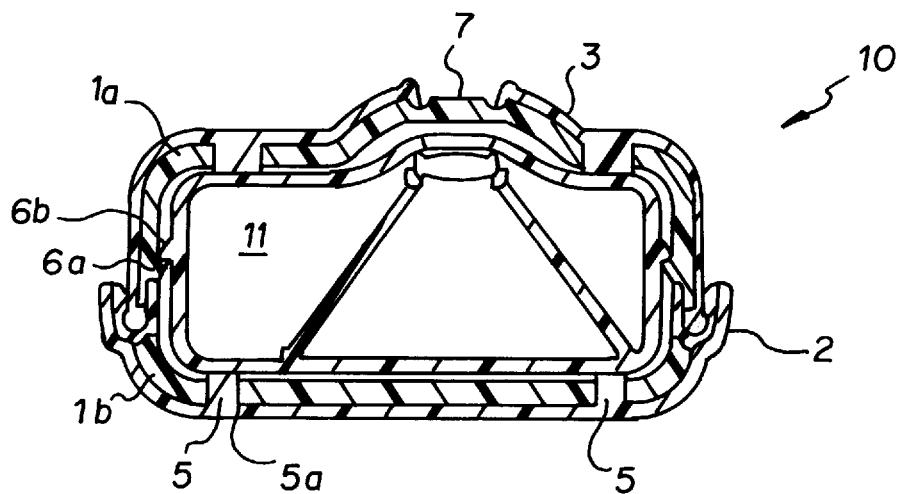
FIG. 6 shows in a diagrammatic view the watertight closed body with a camera along the line I—I in FIG. 1.

The watertight body 10 comprises a front body shell 1a and a rear body shell 1b for accommodating a photographic camera 11, as shown in diagrammatic form in FIGS. 5 and 6. The camera 11 is a so-called single-use camera, which is loaded with photographic film by the manufacturer and given to a finisher for development of the film after the latter has been exposed. Since cameras of this type are sufficiently known, no further description is provided. It is merely pointed out that the outer camera body shape and the inner shape of the body shells 1a and 1b are matched to one another and have engagement elements/means to which reference is made in the following.

Both body shells 1a and 1b comprise a rigid polymer material, preferably an optically transparent polystyrene. The inner wall of the body shell 1b has engaging elements 6a of nose type that engage with engaging elements provided on the camera wall. The two body shells 1a and 1b are firmly connectable by locking means 9a and 9b. The locking means comprise the locking hook 9a formed in one piece with the body shell 1a, and the elastically flexible locking strip 9b formed in one piece with the body shell 1b. In the assembled state of the body shells, the locking means 9a, 9b are covered by the body walls and are hence not accessible for unlocking. To that end, at least one marked wall area 9d is provided on the body shell 1a that can be cut through using a tool, for example a screwdriver, to unlock at least one of the engaged means 9a and 9b. This is achieved by providing in the wall areas 9d openings in the body shell 1a which are closed only by the thermoplastic covering means 3.

On the body shell 1a, a sealing means or sealer 2 has a droplet shaped cross-section, when undeformed, and consists of a thermoplastic elastomer, such as, styrene-butadiene (ISO designation: TE(PEBBS+PP)). The sealing means is provided on the edge 2a, which forms or defines a joint of the body, between the shells. The sealing means can be pressed into a groove 4 encircling the body shell 1b. In the pressed-in/assembled state of the body shells, watertightness is already achieved by an overdimensioning of the droplet-shaped sealing means 2 in comparison with the groove 4, without the aforementioned locking means 9a and 9b having to be connected to one another. Since the resetting forces of the sealing means act vertically to the joint, no further force is necessary to keep the body shells together in the unloaded state.

In a further embodiment, a covering means or covering 3 is provided on the outer surfaces of one or both body shells 1a, 1b. The covering means is a thermoplastic elastomer like the sealing means. The covering means has, for improvement of the grip, areas 3a that are designed raised. Areas 3b free of covering means further improve the grip qualities by virtue of the resultant differing surface heights. The areas 3b, for example around the lens, carry an informative or decorative label. For carrying the camera, a carrying means or carrier 9c designed as a lug for suspension of a carrying strap or the like is provided and is formed in one piece with the covering means 3.

The body shells 1a and 1b, the sealing means 2, the covering means 3 and 3a, the holding means 5 and the carrying means 9c are made in a multiple-component injection molding process, in particular a two-pack process (2K-process), such that looping of the molecule chains results between the two polymer materials. In a first injection molding step, the body shell 1a is made from polystyrene and in a second step, without a change of the mold, the sealing means 2, the covering means 3 and 3a and the carrying means 9c designed as a lug are provided. The manufacture of the body shell 1b from polystyrene with its surface areas of thermoplastic elastomer, styrene-butadiene, is achieved similarly.

The covering means 3 and 3a are best restricted to certain surface areas improving the grip on the camera, but can also comprise the entire outer surface with the exception of the opening for the lens 7, the viewfinder 8, the opening for the flash unit and the areas 3b. By adding suitable colorants, the body can be colored to achieve light-tightness or can be left transparent.

A free surface can be provided in an area around the lens, which is not covered by the covering layer and on which a C-shaped information plate is arranged on the inside of the body. With an optically transparent body shell 1a, the information on the plate is readable from the exterior of the body. Between the lens 7 and the inner edge formed by the C-shaped plate, a non-transparent cup is provided which encloses the lens and can be made of a thermoplastic elastomer. The C-shaped surface and the information plate are configured such that they partially enclose the non-transparent cup.

Furthermore, holding means or holders 5 for the camera 11 are provided in the body wall of both body shells 1a, 1b. These are also formed from the styrene-butadiene elastomer and fill the cylindrical penetrations 5a of the body shells so as to project beyond the inner body wall. The surface of the camera 11 in the embodiment is therefore in contact with the holding elements 5 of the body shells in the state locked by the engaging elements 6a and 6b.

For the body shells 1a, 1b and for the sealing, covering and holding means 2, 3, 3a, 5 and 9c, polycarbonate/polyurethane can also be used in addition to the material combination already stated of polystyrene/styrene-butadiene.

An actuating means 12, comprising a thumbwheel having an integrated release button for film transport and for release, is connected to the body shells in watertight form. To that end, the body shells have a shaped collar for accommodating a sealing element and for supporting the thumbwheel, which however is not shown in the drawing. The release button designed as a watertight rubber diaphragm release transmits in known manner the release movement by means of a plunger to a release lever arranged inside the camera (also not shown).

After complete exposure of the film, the body 10 is opened using a tool, as already described, and both body shells are conveyed to a device known per se for crushing, for example a shredder, without separation of the materials. The resultant material granulate mixture can be used as a feedstock for making new light-impermeable camera components by injection molding, where exclusively the material combination polystyrene/styrene-butadiene is used for the body shells 1a and 1b and for the sealing, covering and holding means 2, 3, 5, 9c. The crushed body feedstock is preferably used in an admixture with a feedstock of new polystyrene material for injection molding, at a maximum of 25 parts by weight of crushed body feedstock to 100 parts by weight of new polystyrene material.

It is an advantageous effect of the present invention that a watertight body is provided for accommodating a photographic camera that is of simple design and ensures dependable watertightness. A further advantageous effect of the present invention is that inexpensive recyclability of the used camera body can be assured.

By providing a sealing means comprising an elastic polymer material, in particular a thermoplastic elastomer, by a multiple-component injection molding process on an edge of at least one body shell that forms the joint and by connecting it to the body shell by chain looping of the polymer materials, a body can be provided that manages without additional and separately attached sealing elements. The adhesion of the sealing means in accordance with the invention is achieved by the chain looping of the molecules between the material of the body shell and that of the sealing means during injection molding. Additional adhesion connectors, such as adhesives or the like, are not necessary.

Advantageously, the sealing means is of droplet shape on the edge of the first body shell, with the second body shell having a circumferential groove in which the sealing means is deformed in the assembled state of the body shells such that the camera body is watertight. Thanks to a bumper-like design of the second body shell in the area of the encircling seal, the latter is well protected against mechanical effects, such as knocks etc.

A covering means provided by multiple-component injection molding on the outer surfaces of the body shells, is also connected to the body shells by chain looping. By a suitable color additive to the elastomer, a camera body that can be advantageously designed is achievable. Raised areas of the covering means and areas free of the latter ensure in addition a good grip on the camera under water. A carrying means designed as a lug for attachment of a carrying strap or the like is designed in one piece with the covering means, such that a low-cost manufacture is possible without additional fitted parts and handling of the camera under water is further improved. In addition, a good shock-absorbing effect for the camera is provided by the covering means.

In a further advantageous modification, the sealing, covering and carrying means are designed in one piece, i.e. they are provided using the multiple-component injection molding process on the body shells during a manufacturing process step, thereby achieving a particularly inexpensive manufacture. The design of the body in accordance with the invention further prevents any inadvertent opening of the camera by the user, since the locking means provided on the body shells are concealed by the shells in the connected state.

A watertight body for accommodating a photographic camera is therefore achievable in accordance with the invention with a minimum number of individual parts to be assembled.

Another advantage during manufacture of a photographic camera made of a first and a second body shell of rigid polymer material which can be joined together and have openings for a lens and a viewfinder, consists in that at least the body shell forming the camera front is moulded in a tool using a rigid polymer material and that in the same tool a covering layer made of an elastic polymer material is then connected to the body shell by chain looping of the polymer materials using the two-pack injection moulding process.

Better recyclability than in the prior art, and hence also better protection of the environment, is achieved in that the body shells are crushed without separation of the polymer materials using known devices, and the resultant material mix is used as a feedstock for the manufacture of new camera components, in an admixture with new polystyrene material in a ratio not exceeding 25 parts by weight to 100 parts by weight. As a result, a greatly improved impact strength is achieved in the newly manufactured camera components when compared with polystyrene.

While specific embodiments of the invention have been shown and described herein for purposes of illustration, the protection afforded by any patent which may issue upon this application is not strictly limited to a disclosed embodiment; but rather extends to all modifications and arrangements which fall fairly within the scope of the claims which are appended hereto:

What is claimed is:

1. A watertight body for a photographic camera, said body comprising:

a first and a second body shell of rigid polymer material, said body shells being joined together to define a cavity adapted to accommodate said camera, at least one of said body shells having an edge disposed to define a joint between said body shells; and a seal of elastic polymer material on said edge, said seal being connected to said edge by molecular entanglement of said rigid and elastic polymer materials.

2. A watertight body according to claim 1, characterized in that:

said seal has an undeformed cross-section that is droplet shaped; and said second body shell has a circumferential groove, said groove being underdimensioned relative to said seal such that said seal is deformed when said body shells are joined together, whereby said body is watertight.

3. A watertight body according to claim 1, further comprising a cover of elastic polymer material on the surface areas of said body shells and being connected to said body shells by molecular entanglement of said rigid and elastic polymer materials.

4. A watertight body according to claim 3, characterized in that said cover is transparent.

5. A watertight body according to claim 3, characterized in that said cover is light-tight.

6. A watertight body according to claim 3, characterized in that:

said body shells define a surface when joined together; and said cover is provided on substantially the entire surface of said body shells exclusive of lens and viewfinder openings and areas free of covering for gripping the body.

7. A watertight body according to claim 3 characterized in that:

said body shells define a surface when joined together;

said first body shell is transparent;

said body further comprises a C-shaped information plate adjoining said first body shell; and said cover is provided on substantially the entire surface of said body shells exclusive of an opening over said information plate.

8. A watertight body according to claim 3, characterized in that said cover provided on said body shells has raised areas for a sure grip.

9. A watertight body according to claim 8, further comprising a carrying means for holding the camera formed in one piece with said cover.

10. A watertight body according to claim 1, further comprising locking means for connecting said body shells, said locking means being provided in one piece with said body shells, said locking means being inaccessibly covered when said body shells are joined together.

11. A watertight body according to claim 10, characterized in that said first body shell has a marked wall area that can be cut through using a tool to unlock at least one of said locking means.

12. A watertight body according to claim 1, further comprising camera holding means projecting inward from said body shells.

13. A watertight body according to claim 1, further comprising:

a cover disposed on surface areas of at least one of said body shells; and camera holding means projecting inward from said body shells; said sealing means, said cover, and said camera holding means each comprising elastic polymer material.

14. A watertight body according to claim 13, characterized in that said elastic polymer material is a styrene-butadiene or polyurethane.

15. A watertight body according to claim 13, characterized in that said rigid polymer material is polystyrene and said elastic polymer material is styrene-butadiene.

16. A watertight body according to claim 13, characterized in that said rigid polymer material is polycarbonate and said elastic polymer material is polyurethane.

17. A watertight body according to claim 1, characterized in that said first body shell has integral engaging elements for holding said camera against at least one of said body shells.

18. A watertight body according to claim 1, characterized in that said body shells comprise an optically transparent polystyrene or polycarbonate.

* * * * *